(12) United States Patent
Jiang et al.

(10) Patent No.: US 7,779,100 B2
(45) Date of Patent: Aug. 17, 2010

(54) INTEGRATED ACCESS MANAGEMENT OF ELEMENT MANAGEMENT SYSTEMS

(75) Inventors: Baofeng Jiang, Pleasanton, CA (US); Yew-Aik Michael Lim, Fremont, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 634 days.

(21) Appl. No.: 11/452,319

(22) Filed: Jun. 14, 2006

(65) Prior Publication Data

US 2007/0294379 A1   Dec. 20, 2007

(51) Int. Cl.
*G06F 15/16* (2006.01)

(52) U.S. Cl. ........................................ 709/223; 709/224

(58) Field of Classification Search ................. 709/223, 709/224
See application file for complete search history.

(56) References Cited

U.S. PATENT DOCUMENTS

| | | | |
|---|---|---|---|
| 5,870,554 A * | 2/1999 | Grossman et al. | 713/2 |
| 6,363,421 B2 | 3/2002 | Barker et al. | |
| 6,901,440 B1 | 5/2005 | Bimm et al. | |
| 2002/0116485 A1 * | 8/2002 | Black et al. | 709/223 |
| 2004/0203359 A1 * | 10/2004 | Sasai et al. | 455/41.1 |
| 2006/0020686 A1 * | 1/2006 | Liss et al. | 709/219 |
| 2006/0072467 A1 * | 4/2006 | Manthoulis et al. | 370/241 |
| 2006/0200828 A1 * | 9/2006 | Na | 719/313 |
| 2007/0130322 A1 * | 6/2007 | Cambron et al. | 709/224 |
| 2007/0150417 A1 * | 6/2007 | Hu | 705/59 |

* cited by examiner

*Primary Examiner*—Benjamin R Bruckart
*Assistant Examiner*—Shripal K. Khajuria
(74) *Attorney, Agent, or Firm*—Greenblum & Berstein, P.L.C.

(57) ABSTRACT

Access to network elements of a telecommunications network is integrated through a common access point by an integrated access application which receives a request for communication with a network element. An element management system (EMS) group, including at least one EMS server, associated with the network element is identified. The at least one EMS server is queried to identify an active EMS server and to determine whether the active EMS server has an available connection sufficient to support the request. When the active EMS server has the available connection, the request is sent over the available connection. When the active EMS server does not have the available connection, the request may be buffered and, after a predetermined time, it is again determined whether the active EMS server has the available connection. When the request is sent, it may be multiplexed with other requests over the same available connection.

12 Claims, 4 Drawing Sheets

INTEGRATED ACCESS MANAGEMENT OF ELEMENT MANAGEMENT SYSTEMS

BACKGROUND

1. Field of the Disclosure

The present disclosure relates to the field of telecommunications, and more particularly, to efficiently accessing network elements through coordination and management of element management systems.

2. Background Information

Network providers deploy numerous network elements, such as central office terminals, switches, digital subscriber line access multiplexers (DSLAMs), remote terminals and the like, for various types of networks, including digital subscriber line (DSL), asymmetric DSL (ADSL), very high speed DSL (VDSL), time division multiplexed (TDM), wavelength division multiplexing (WDM) and asynchronous transfer mode (ATM) networks. The network elements are managed in order to coordinate provisioning of services, to detect faults and errors and to collect network data, typically through element management system (EMS) servers. There are numerous types of EMS servers provided by different vendors, having differing capabilities, requirements and constraints. For example, EMS servers from one vendor may only provide management access to DSLAMs from the same vendor.

EMS servers are typically accessed through clients, such as web-based management application and bulk-loading batch application clients, as well as direct access users. Each EMS server allows a limited number of management application clients to connect to it at one time (e.g., approximately 15), depending on its specific design. Accordingly, the number of clients that the web-based management application, for example, can concurrently support for each EMS is limited to the same number. Further, bulk-loading batch applications typically must be run alongside the management applications. These batch applications require a large number of connections for each EMS (e.g., approximately 10) due to traffic load, leaving only the remaining EMS server connections (e.g., approximately 5) available for the management applications. Further, different vendors place different limits on client traffic to their respective EMS servers, such as limits on the maximum number of outstanding transaction language 1 (TL1) commands to the EMS server, the maximum number of outstanding TL1 commands to a DSLAM or other network element, and the maximum number of DSLAMs or other network elements that can be addressed by all the outstanding TL1 commands. Currently, management applications encounter and detect error situations when any of these limits are exceeded, and may abort the operation and/or provide error indications to the users as a result.

EMS servers may be grouped with other EMS servers for accessing a group of related network elements, for example. Typically, one of the EMS servers in each group assumes the primary role and the others assume backup roles. Often, all but one of the EMS servers in an EMS group may be shutdown or otherwise inoperable. Therefore, the management applications attempting to access network elements through an EMS group are expected to be able to determine the functional EMS server. This also applies to users attempting to connect directly to an EMS server to execute TL1 commands. Currently, external scripts and utilities may be used to poll periodically each EMS server within each of the EMS groups, and record in a database which EMS servers are functional. Accordingly, management application clients and direct access users consult these database records. However, the database records may be stale, for example, if an EMS server is shutdown between polling intervals. Also, management application clients and direct access users lose access when the EMS server to which they are currently connected shuts down.

Accordingly, there is a need for efficient, comprehensive management of network elements and the EMS servers and/or EMS groups servicing them.

BRIEF DESCRIPTION OF THE DRAWINGS

The present disclosure provides the detailed description that follows by reference to the noted drawings by way of non-limiting examples, in which like reference numerals represent similar parts throughout several views of the drawings, and in which.

DETAILED DESCRIPTION

Figure 1:
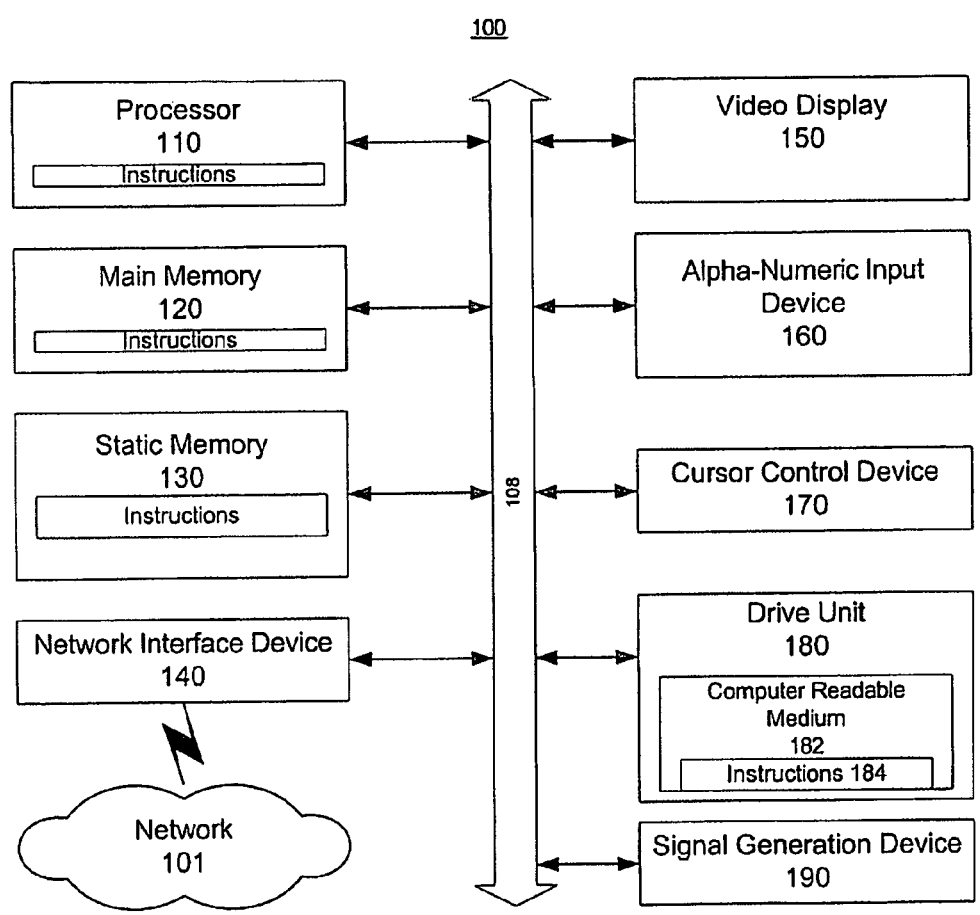
FIG. 1 shows an exemplary general computer system that includes a set of instructions for performing processing, according to an aspect of the present disclosure.

The present disclosure relates to providing integrated access to and management of a communications network infrastructure, including connections with various network elements through corresponding element management systems (EMS) servers and/or EMS server groups.

To support network operations, network providers rely on various management applications, such as operation support system (OSS) applications. An OSS may access network elements (NEs) through an associated EMS "northbound interface" (i.e., for communication between an EMS server and a NE) for provisioning, performance data retrieval, network optimization and the like. Also, network providers may deploy EMS servers in groups for redundancy purposes, requiring an OSS to determine dynamically which EMS server within an EMS group is currently active.

The present disclosure provides a software implemented application/algorithm that supplies integrated access management for network management applications, such as OSSs. The software application can be used, for example, by web-based management applications and bulk loading batch applications to access any configured EMS server. The integrated access application, which may include a software library and a list of configurable options, provides direct access to EMS groups and EMS servers through a single point of access. Significantly, the integrated access application automatically determines the functional EMS server(s) within EMS groups, and automatically directs client communications (e.g., TL1 commands and responses) to the functional EMS server. When a previously functioning EMS server is shut down, the integrated access application detects the change and switches to another functional EMS server within the EMS group (if one exists). When there is not another functional EMS server with the EMS group, the integrated access application buffers the communication requests and periodically checks the EMS group for a functional EMS server, and reestablishes the connection when one is found.

This capability increases application continuity and eliminates the need for external scripts and utilities to periodically poll for each EMS server within the EMS groups.

The integrated access application provides a number of additional capabilities that enhance network management efficiency. For example, the integrated access application multiplexes a large number of client sessions for a particular EMS server onto the limited number of connections actually configured for the EMS server. This enables management applications and the like to handle a larger number of concurrent clients for an EMS server. Further, the integrated access application shapes the command traffic from clients, so that the various configured vendor-specific limits of the EMS servers are not exceeded, to avoid overwhelming any EMS server and the resulting error conditions. This includes controlling the connections and flow of information in order to increase the efficiency of communications. For example, the integrated access application buffers client requests when vendor-specific limits are exceeded and automatically sends the requests once the EMS server again becomes available. Also, the integrated access application enables web applications to dynamically reduce or increase the number of connections to any EMS server.

In view of the foregoing, the present disclosure, through one or more of its various aspects, embodiments and/or specific features or sub-components, is thus intended to bring out one or more of the advantages as specifically noted below.

An aspect of the present disclosure provides a method for integrating access to network elements of a telecommunications network through a common access point. The method includes receiving a request for communication with a network element; identifying an element management system (EMS) group associated with the network element; querying at least one EMS server in the EMS group to identify an active EMS server in the EMS group; and determining whether the active EMS server has an available connection sufficient to support the request. When the active EMS server has the available connection, the request is sent over the available connection. Sending the request may include multiplexing the request with at least one other request to the active EMS server. When the active EMS server does not have the available connection, the request is buffered, and after a predetermined time, it is again determined whether the active EMS server has the available connection. The request for communication may include a TL1 command.

A type of the active EMS server may be determined, as well as at least one configuration constraint corresponding to the type of EMS server. Determining the type of the active EMS server may include querying a database of EMS servers and associated types. Then, determining whether the active EMS server has the available connection to support the request for communication may be based on the at least one configuration constraint. Also, identifying the EMS group associated with the network element may include querying a database of network elements and associated EMS groups.

Another aspect of the present disclosure provides a method for integrating access to network elements of a telecommunications network, including receiving a command from a client application, which may be a TL1 command, and directed to a network element in the telecommunications network. An EMS group associated with the network element is identified, as well as at least one active EMS server in the EMS group. It is determined whether the active EMS server has at least one available connection having sufficient capacity to support the command. When the active EMS server has the at least one available connection having sufficient capacity, a user session is established with the active EMS server over the at least one available connection and the command is multiplexed with at least one other command to send to the active EMS server over the available connection. The other command may be associated with another user session.

Identifying the active EMS server may include polling the EMS servers in the EMS group after receiving the command. Also, when the active EMS server does not have the at least one available connection, the command is not sent to the network element. The command may be buffered for a predetermined period of time. Then, it is periodically determined whether the active EMS server has at least one available connection having sufficient capacity to support the command during the predetermined period of time. When an available connection becomes available, the user session is established with the active EMS server over the available connection(s). A type of the active EMS server may be determined, as well as at least one configuration parameter corresponding to the type of EMS server. Then, determining whether the active EMS server has the at least one available connection having sufficient capacity to support the command may be based on the at least one configuration parameter.

Another aspect of the present invention provides a computer readable medium that stores a computer program for integrating access to network elements of a communications network. The computer readable medium includes a receiving code segment, a group identifying code segment, an EMS identifying code segment, a determining code segment and a connection code segment. The receiving code segment receives a command from a client application, the command being directed to a network element in the communications network. The group identifying code segment identifies an EMS group associated with the network element, and the EMS identifying code segment identifies at least one active EMS server in the EMS group. The determining code segment determines whether the active EMS server has at least one available connection having sufficient capacity to support the command. The connecting code segment establishes a user session with the active EMS server over the at least one available connection and sends the command to the network element through the active EMS server when the active EMS server has the at least one available connection. The connecting code segment suspends the command when the active EMS server does not have the at least one available connection. The connecting code segment may suspend sending the command for a predetermined period of time, during which the determining code segment periodically determines whether the active EMS server has at least one available connection having sufficient capacity to support the command.

The computer readable medium may further include a notifying code segment that notifies the client application that the sending of the command has been suspended. The computer readable medium may also include a multiplexing code segment that multiplexes the command sent to the network element with other network commands.

Yet another aspect of the present disclosure provides an apparatus for integrating access to network elements of a communications network, which includes multiple network elements. The apparatus includes a first interface that interfaces with at least one application and a second interface that interfaces with multiple EMS groups, each of which includes at least one EMS server. Each EMS group is configured to connect to at least one network element of the multiple network elements. The apparatus also includes a processor that receives a command directed to a network element from the at least one application through the first interface, determines an EMS group from the multiple EMS groups associated with the network element, identifies at least one active EMS server in the determined EMS group, and determines whether the active EMS server has at least one available connection having sufficient capacity to support the command. The application may be an operation support system (OSS) application.

When the active EMS server has the at least one available connection having sufficient capacity, the processor establishes a session with the active EMS server over the at least one available connection through the second interface and sends the command to the network element through the active EMS server. When the active EMS server does not have the at least one available connection having sufficient capacity, the processor suspends the command. The processor may also multiplex the command with at least one other command when sending the command to the network element through the active EMS server.

The various aspects and embodiments of the present disclosure are described in detail below.

Referring to FIG. 1, a description is now provided of an illustrative embodiment of a general computer system 100, on which the application integration process can be implemented. The computer system 100 can include a set of instructions that can be executed to cause the computer system 100 to perform any one or more of the methods or computer based functions disclosed herein. The computer system 100 may operate as a standalone device or may be connected, e.g., using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, e.g., a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g., software, can be embedded. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Using a general computer system as shown in FIG. 1, a process for integrated access to a network may be provided. The system of FIG. 1 can also operate as various elements within the network. For example, a program implementing the disclosure may be loaded and executed on one or more web servers. Alternatively, the program may be run locally on a PC or a server dedicated to a particular user group or region.

Figure 2:
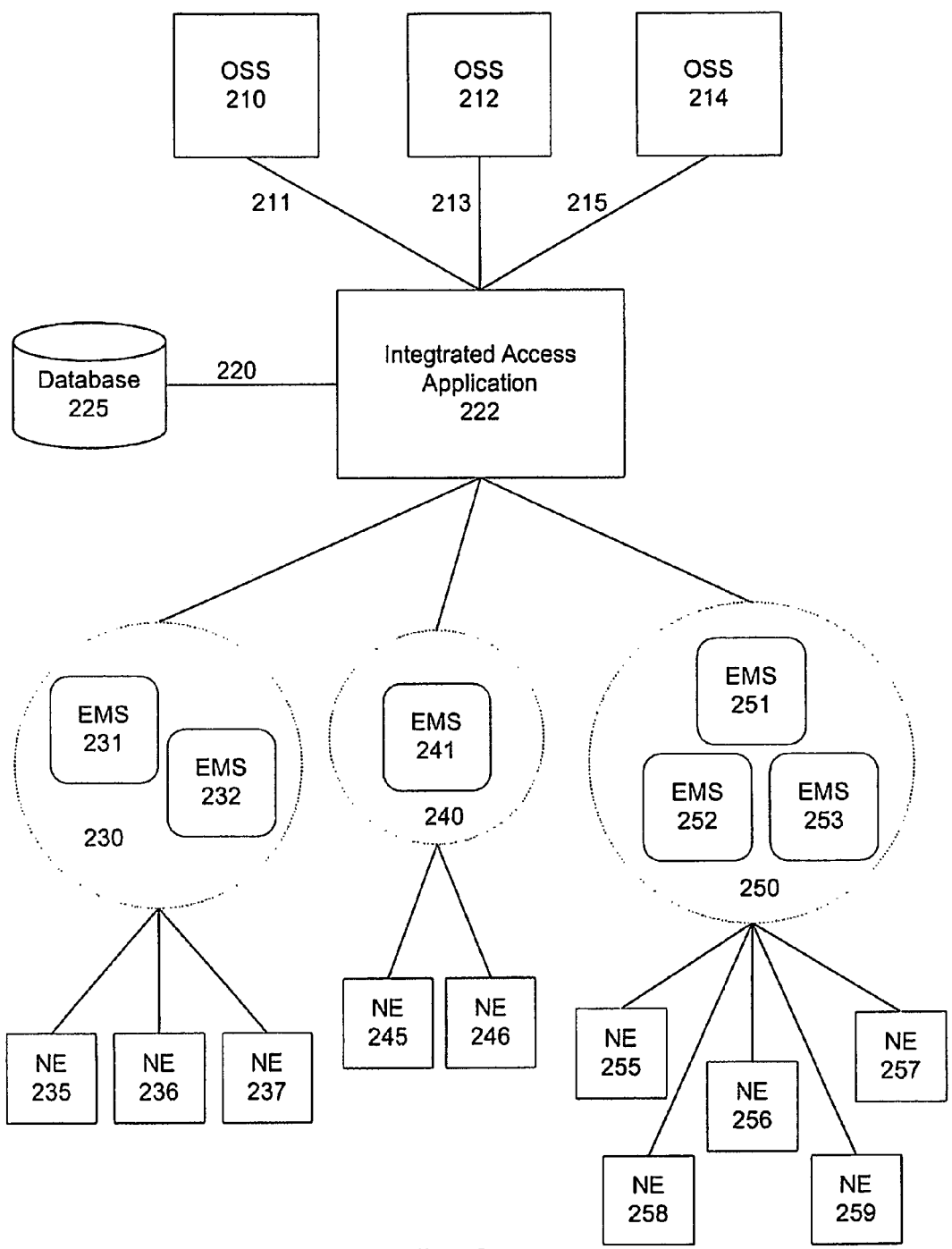
FIG. 2 shows an exemplary architecture of an integrated access management application in a network, according to an aspect of the present disclosure.

The block diagram of FIG. 2 provides a high-level network architecture of an exemplary embodiment of the present disclosure. In particular, an integrated access application 222 is depicted connected to multiple operation support systems, OSS 210, OSS 212 and OSS 214. In the depicted embodiment, each OSS includes a user application for communicating with various network elements, such as NEs 235-237, NEs 245-246 and NEs 255-259. For example, the OSS 210 may be a web based, real-time management application, while the OSS 212 may be a bulk loading batch application. Of course, the integrated access application 222 may operate with any type of OSS or similar network management application, as well as with a direct access user (not pictured) without departing from the spirit or scope of the present invention.

Further, the OSS 210, the OSS 212 and the OSS 214 are connected to the integrated access application 222 through lines 211, 213 and 215, respectively. These lines represent any type of connection capable of communicating data to and from the integrated access application 222, including hard-wired connections, wireless networks, Ethernet connections, and packet switching networks, such as private intranets or the World Wide Web (i.e., the Internet).

The integrated access application 222 is also connected to the various elements of the telecommunications network. In the exemplary embodiment depicted in FIG. 2, the integrated access application 222 is connected to three EMS groups, which may include various numbers of actual EMS servers. For example, EMS group 230 includes EMS 231 and EMS 232; EMS group 240 includes EMS 241; and EMS group 250 includes EMS 251, EMS 252 and EMS 253. The number of EMS servers in each EMS group typically depends on the number of NEs to be serviced, as indicated in FIG. 2. For example, EMS group 230 services NE 235, NE 236 and NE 237, EMS group 240 services NE 245 and NE 246, and EMS group 250 services NE 255, NE 256, NE 257, NE 258 and NE 259. The size of each EMS group may vary according to the number of network elements and the capabilities of the EMS servers, without affecting the spirit and scope of the present invention.

The integrated access application 222 is connected to a database 225, indicated by line 220. The database 225 may be a separate database or integrated within the integrated access application 222 itself. The connection 220 may be any type of connection, including hardwired connections, wireless networks, Ethernet connections, and packet switching networks, such as private intranets or the World Wide Web (i.e., the Internet). The database 225 stores the network information enabling the integrated access application 222 to efficiently manage communications. For example, in an embodiment, the database 225 stores information on each of the EMS groups 230-250 and the corresponding NEs 235-259. The stored information includes, for example, the make and model of each EMS server within the EMS groups, as well as the capabilities of these EMS servers, such as the number of concurrent connections available. For example, the EMS servers 231 and 232 may be Alcatel Litespan Management System servers, for example. The database 225 also associates each network element with a particular EMS group and/or EMS server. For example, when the integrated access application 222 is instructed to contact NE 257, it first queries database 225, which provides data identifying EMS group 250, and indicating that EMS group 250 consists of three EMS servers, EMS 251, EMS 252 and EMS 253.

The integrated access application 222 may be implemented in any of various formats and/or configurations without departing from the spirit and scope of the present invention. For example, in an embodiment of the disclosure, the integrated access application 222 may be configured as a stand alone application, including a software library, accessible through socket connections. Alternatively, the integrated access application 222 may be configured as an application program interface (API), and thus may reside with the management application, for example, at OSS 210, or may reside on a separate server. As an API, the integrated access application 222 may interact more with the management application, providing more user control, but would function in the same manner with respect to the present disclosure. For example, as an API, the integrated access application 222 may be used to individually set wait times for different commands to control time out settings from the user's work station (e.g., depicted in FIG. 1). Otherwise, the integrated access application 222 may have to set the same wait time for all commands at once. Significantly, the integrated access application 222 provides users who want direct access to an EMS a single point of access without having to first determine which of EMS in the associated EMS group is functional, as discussed below.

In an embodiment of the disclosure, the configuration options accepted by the integrated access application may include the following: (i) EMS groups with primary and backup EMS servers within each EMS group; (ii) the number of connections used for each EMS server; (iii) the vendor-specific, maximum number of outstanding TL1 commands for each EMS server; (iv) the vendor-specific maximum number of outstanding TL1 commands to a particular network element; and (v) the vendor-specific maximum number of network elements that can be addressed by all outstanding TL1 commands at an EMS server.

Figure 3:
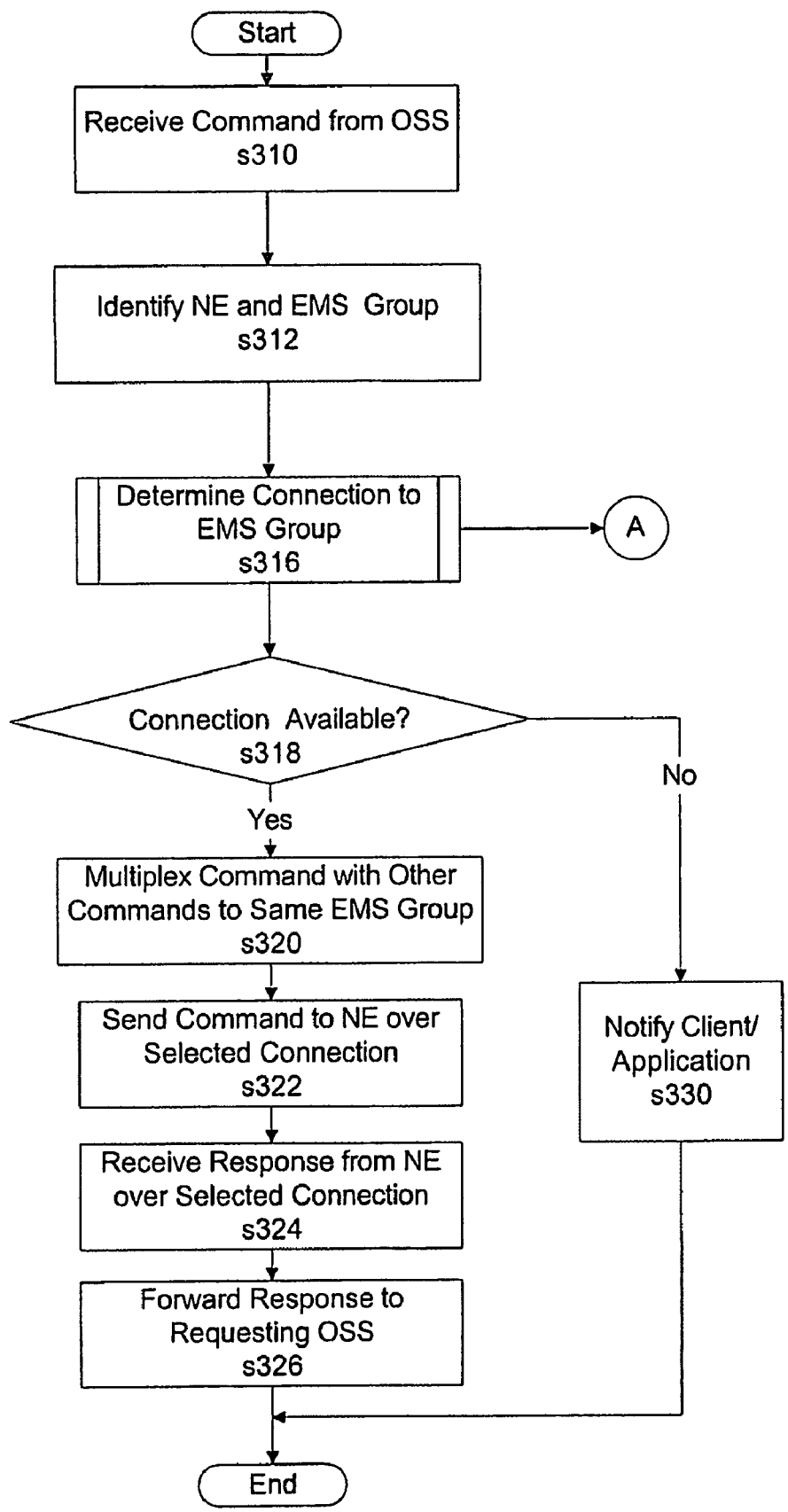
FIG. 3 shows an exemplary flowchart of the integrated access management process, according to an aspect of the present disclosure.

FIG. 3 is an exemplary flow diagram according to an aspect of the present disclosure, showing sample functionality of the integrated access application 222. At step s310, the integrated access application 222 receives a command requiring network access from a management application, such as OSS 210, or a direct access user. The request may be, for example, a TL1 command seeking data from a particular network element, such as NE 257. TL1 is a typical format for communicating with network elements and includes, for example, commands for provisioning and deleting services, initializing and configuring equipment, retrieving information on alarms and failure signals, setting user access, and the like. However, any protocol for communicating with network elements may be incorporated without departing from the spirit and scope of the present invention.

At step s312, the integrated access application 222 identifies the NE to which the command corresponds, and the EMS group through which to contact the NE. The command may include identification numbers corresponding to both the NE and the EMS group. In an embodiment, the configuration files of the integrated access application 222 include the EMS groups in the network and associated identification numbers. The integrated access application 222 may then use the identification number included in the received command to determine which EMS group to access. In an alternative embodiment, the integrated access application 222 queries the database 225 to identify the NE to which the command is directed and/or the EMS group (if not included in the specific request). For example, the NE 257 and the EMS group 250 may be identified at step s312.

Figure 4:
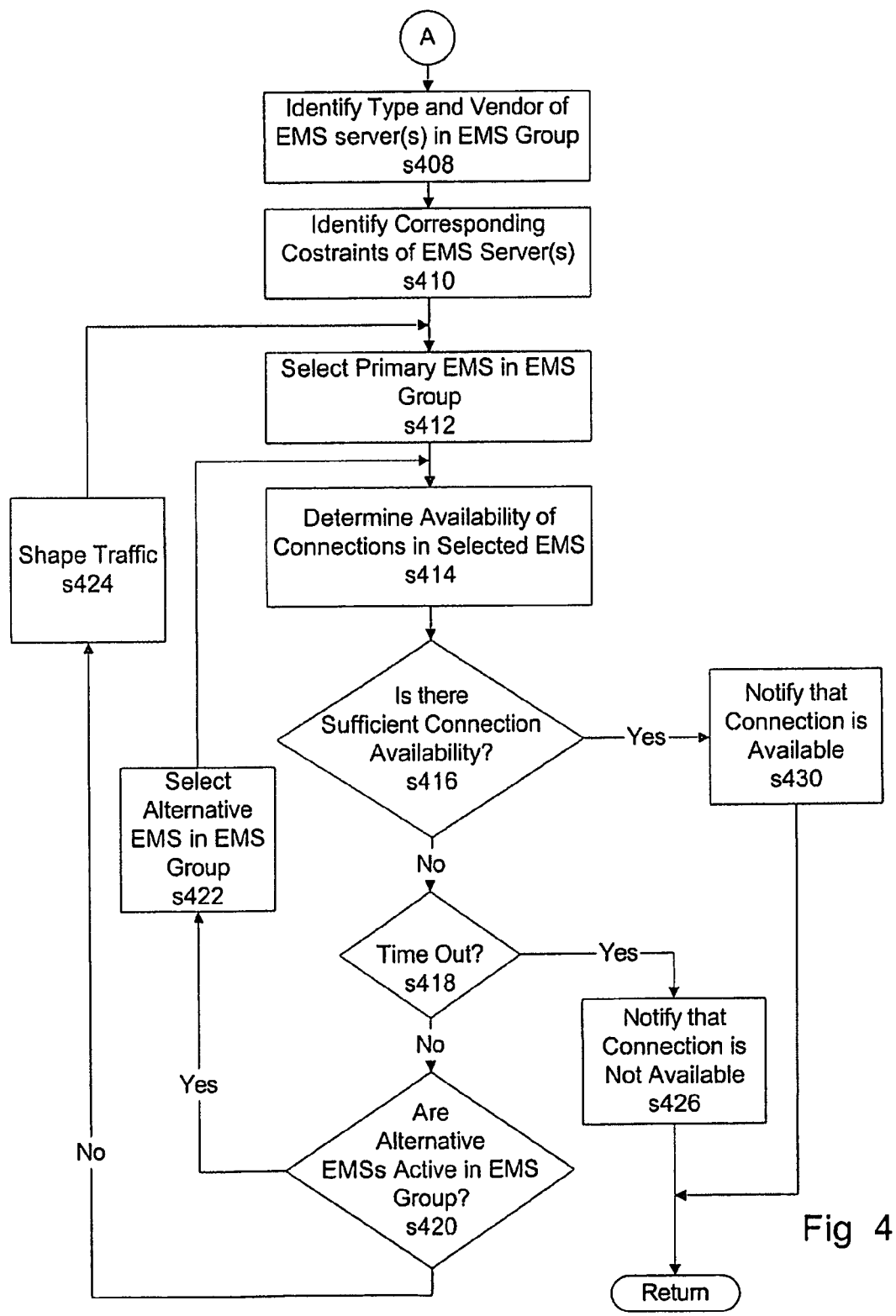
FIG. 4 shows an exemplary flowchart of the integrated access management process, according to an aspect of the present disclosure.

Step s316 is a process step which is performed to determine whether there are sufficient available connections to the identified EMS group, and the identity of the connections. Referring to FIG. 4, the integrated access application 222 retrieves data regarding the EMS group, such as data identifying the type of EMS servers within the EMS group and vender specific parameters and/or constraints corresponding to the EMS server types. For example, the integrated access application 222 determines the type and vendor of each EMS server 251, 252 and 253 within the EMS group 250 at step s408. In an embodiment, the EMS group data is retrieved from the database 225, although it may be loaded pursuant to the configuration file in alternative embodiments, as discussed above.

This information enables the integrated access application 222 to identify the capabilities and/or constraints corresponding to each of the EMS servers at step s410. These constraints include the number of connections the EMS server can handle simultaneously, the number of NEs that the EMS server can service, and the number of connections the NEs can handle simultaneously. For example, it may be determined that the EMS servers 251, 252 and 253 within EMS group 250 have the capability to provide fifteen simultaneous TL1 connections with the integrated access application 222 and 100 simultaneous connections to NEs, while each of the NEs many be able to provide three connections in parallel.

At step s412, the integrated access application 222 identifies the functioning primary EMS server in the EMS group 250. This determination is made in real-time by querying or polling each of the EMS servers within the EMS group, e.g., EMS 251, EMS 252 and EMS 253, rather than relying on a database indicating the status of the EMS servers. This eliminates the need for external scripts and utilities to periodically poll the EMS servers within the EMS groups, and to update a status database. As stated above, a drawback of using such a database is that the identity of the primary EMS server within an EMS group is dynamic, so the database may not be current.

The number of available connections for the primary EMS server (e.g., EMS 251) is determined at s414 by subtracting the number of connections currently in use from the number of available connections (e.g., based on the connection limitations determined at step s410). In addition, because the integrated access application 222 is able to multiplex multiple commands onto a single EMS server connection (discussed with respect to step s320 below), step s414 may further include determining whether connections exist which may have existing capacity to accept additional user sessions and/or multiplexed commands. For example, an EMS server may be able to handle 10 to 20 user sessions over one connection by multiplexing commands. Therefore, even when the integrated access application 222 determines that all connections of the EMS 251 are in use, there may still be sufficient available connectivity when at least one of the connections is being used for less than the maximum number of simultaneous user sessions.

The integrated access application 222 determines whether available connectivity of the EMS server is sufficient for the intended communication at step s416. For example, a bulk-loading batch application may require as many as 10 simultaneous connections with the EMS 251, and the EMS 251 only has 5 connection available. When it is determined that sufficient connectivity is available, the integrated access application 222 selects a connection to the EMS server 251, for example, at step s430 and returns to the process of FIG. 3 at step s316, along with the information identifying the selected connection(s). The selected connection may be an existing connection having available capacity for multiplexing an additional session.

On the other hand, when there is not sufficient available connectivity, as determined at step s416, the integrated access application 222 determines whether a time out has occurred at step s418. As stated above, the length of the specific time out may be individually set by the user, for example, when the integrated access application 222 is configured as an API. When the time out has not yet occurred, the integrated access application 222 determines whether there are alternative active EMS servers in the EMS group 250 at step s420. Again, this is accomplished by polling the remaining servers, e.g., EMS 252 and EMS 253, within the EMS group, to determine whether they are active.

When the integrated access application 222 finds that another EMS server (e.g., EMS 253) is active within the EMS group 250, it is identified as an alternative EMS server at step s422. The integrated access application 222 then repeats steps s414 and s416 to determine whether sufficient connectivity is available in the EMS 253. If so, a connection is selected at step s430 and the process returns to step s316 of FIG. 3. If not, steps s418 through s422 are repeated until a time out occurs at step s418 or no alternative active EMS servers are found at step s420.

When no alternative active EMS servers are found at step s420, the integrated access application 222 may suspend the command and shape the traffic to fit within the limits of the EMS servers at step s424. For example, the integrated access application 222 may buffer a current TL1 command until a connection becomes free. Alternatively, the connection is simply not attempted and the user/application is notified that the attempt has failed (not shown). Otherwise, when excessive commands are directed to an EMS server (or EMS group), the network may crash or the wrong data may be retrieved with no indication that it is the wrong data. Likewise, the timing of commands from the same management application, or simultaneous commands from other management applications, may be adjusted to accommodate the connection request. For example, the integrated access application 222 may reduce the number of connections and/or commands to an EMS server by a management application before a bulk loading batch application starts, thereby offering the bulk loading batch application more connections for the bulk traffic. Once the bulk loading batch application completes, the number of other EMS server connections and/or commands of the management application can again be increased. The timing may be adjusted according to priorities assigned by the management application and/or the integrated access application 222. After the traffic is shaped at step s424, steps s412 through s430 are repeated, as necessary.

Eventually, if a connection is not identified and selected, a time out occurs at step s418. The integrated access application 222 indicates that a connection is not available at step s426 and the process returns to step s316 in FIG. 3.

Once again in the process of FIG. 3, at step s318, if the integrated application 222 has not found sufficient connectivity to the EMS group 250 based on the process of FIG. 4, the user/application is notified at step s330 and the process ends. Significantly, as discussed above, the command is not allowed to proceed to the network to avoid unintended negative consequences, such as crashing the network or inadvertently retrieving faulty information.

When there is sufficient available connectivity, the integrated access application 222 may multiplex the command with other commands to the same EMS group, to the extent there are other commands, at step s320. By multiplexing commands, the integrated access application 222 extends the capacity of the EMS servers, as a practical matter, and enables additional access to an EMS group per each licensed connection. At step s322, the command is sent to the NE through the selected connection to the EMS identified through the process of FIG. 4. A response is received from the NE over the selected connection, via the EMS server, at step s324 and forwarded to the requesting OSS at step s326. Additional information to be provided or retrieved from various network elements can be obtained by repeating the process.

Although FIG. 3 and FIG. 4 depict a particular sequence of steps, it is understood that the sequence is exemplary to an embodiment, and is not intended to be limiting. For example, in alternative embodiments, the order of the steps may differ, or the various steps may occur simultaneously, without affecting the scope and spirit of the disclosure. Also, although depicted linearly, the various embodiments may be implemented through various programming techniques with appropriate arrangements.

Accordingly, the disclosed process enables OSS applications, direct access users and other clients to communicate with network elements throughout the network through a single point of access. The integrated access application identifies the servicing EMS groups and the functional EMS server(s) within the group. It also determines the available capacity of the functional EMS server(s), based on the particular constraints of the EMS server(s), and establishes the appropriate connection, multiplexing multiple user sessions on a single connection to increase efficiency and to more fully utilize EMS licenses. When connections are not available, pending commands not sent and may be buffered for future attempts.

Although the present specification describes components and functions that may be implemented in particular embodiments with reference to particular standards and protocols, the invention is not limited to such standards and protocols. Each of the standards, protocols and languages represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the spirit and scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments that fall within the true spirit and scope of the present disclosure. Thus, to the maximum extent allowed by law, the scope of the invention is to be determined by the broadest permissible interpretation of the following claims and their equivalents, and shall not be restricted or limited by the foregoing detailed description.

Although several exemplary embodiments have been described, it is understood that the words that have been used are words of description and illustration, rather than words of limitation. Changes may be made within the purview of the appended claims, as presently stated and as amended, without departing from the spirit and scope of the invention in its aspects. Although the description refers to particular means, materials and embodiments, the invention is not intended to be limited to the particulars disclosed, but rather extends to all functionally equivalent structures, methods, and uses such as are within the scope of the appended claims.

What is claimed:

1. A method for integrating access to network elements of a telecommunications network from at least one operation support system through a common integrated access computer system, the method comprising:

receiving, by the common integrated access computer system, a system request from an operation support system for communication with a network element, the system request comprising a transaction language command;

identifying, by the common integrated access computer system, an element management system group associated with the network element, the element management system group comprising at least one element management system server;

querying, by the common integrated access computer system, the at least one element management system server to identify an active element management system server in the element management system group;

determining a type of the active element management server;

determining at least one configuration constraint corresponding to the type of element management system server;

determining, by the common integrated access computer system, whether the active element management system server has an available connection sufficient to support the system request for communication with the network element based on the at least one configuration constraint; and when the active element management system server has an available connection, the common integrated access computer system sending the system request for communication with the network element over the available connection, the sending the system request over the available connection comprising multiplexing the system request with at least one other request to the active element management system server;

when the active element management system server does not have an available connection and a time out has not occurred, the common integrated access computer system determining if an alternative active element management system server is available;

when a time out has not occurred and the alternative active element management system server does not have an available connection, the common integrated access computer system buffering the request for communication with the network element and again determining whether an active element management system server has the available connection after a predetermined time; and when a time out occurs, the common integrated access computer system notifying the operation support system that a connection is not available.

2. The method according to claim 1, in which identifying the element management system group associated with the network element comprises querying a database of network elements and associated element management system groups.

3. The method according to claim 1, in which determining the type of the active element management system server comprises querying a database of element management system servers and associated types.

4. A method for integrating access to network elements of a telecommunications network from at least one client through a common integrated access computer system, the method comprising:

receiving, by the common integrated access computer system, a client command from a client, the client command, comprising a transaction language command, being directed to a network element in the telecommunications network;

identifying, by the common integrated access computer system, an element management system group associated with the network element;

identifying, by the common integrated access computer system, at least one active element management system server in the element management system group;

determining a type of the active element management system server;

determining at least one configuration parameter corresponding to the type of the active element management system server;

determining, by the common integrated access computer system, whether the active element management system server has at least one available connection having sufficient capacity to support the client command based on the at least one configuration parameter; and when the active element management system server has the at least one available connection having sufficient capacity, the common integrated access computer system establishing a user session with the active element management system server over the at least one available connection and multiplexing the client command with at least one other command to send to the active element management system server over the available connection;

when the active element management system server does not have an available connection and a time out has not occurred, the common integrated access computer system determining if an alternative active element management system server is available;

when a time out has not occurred and the alternative active element management system server does not have an available connection, the common integrated access computer system buffering the command and again determining whether an active element management system server has the available connection after a predetermined time; and when a time out occurs, the common integrated access computer system notifying the client that a connection is not available.

5. The method according to claim 4, in which the at least one other command is associated with another user session.

6. The method according to claim 4, in which identifying the at least one active element management system server comprises polling the at least one element management system server after receiving the client command.

7. The method according to claim 4, further comprising:

when the active element management system server does not have the at least one available connection, not sending the client command to the network element.

8. The method according to claim 4, in which determining the type of the active element management system server comprises querying a database of element management system servers and associated types.

9. A non-transitory computer readable medium that stores a computer program for integrating access to network elements of a communications network from at least one client through a common integrated accesser, the computer readable medium comprising:

a receiving code segment that receives, by the common integrated accesser, a client command from a client, the client command, comprising a transaction language command, being directed to a network element in the communications network;

a group identifying code segment that identifies, by the common integrated accesser, an element management system group associated with the network element;

an element management system identifying code segment that identifies, by the common integrated accesser, at least one active element management system server in the element management system group;

determining a type of the active element management system server;

determining at least one configuration parameter corresponding to the type of element management system server;

a determining code segment that determines, by the common integrated accesser, whether the active element management system server has at least one available connection having sufficient capacity to support the client command based on the at least one configuration parameter;

a connecting code segment that establishes, by the common integrated accesser, a user session with the active element management system server over the at least one available connection and sends the client command to the network element through the active element management system server when the active element management system server has the at least one available connection, a multiplexing code segment that multiplexes the client command sent to the network element with other network commands;

an alternative connecting code segment that, when the active element management system server does not have an available connection and a time out has not occurred, determines if an alternative active element management system server is available, a buffering code segment that, when a time out has not occurred and the alternative active element management system server does not have an available connection, buffers the client command and again determines whether an active element system server has an available connection after a predetermined time, and a notification segment that, when a time out occurs, causes the common integrated management system to notify the client that a connection is not available.

10. The computer readable medium according to claim 9, further comprising:

a notifying code segment that notifies the client that the sending of the client command has been buffered.

11. A common integrated access apparatus for integrating operation support system access to network elements of a communications network comprising a plurality of network elements, the common integrated access apparatus comprising:

a first interface that interfaces with at least one operation support system;

a second interface that interfaces with a plurality of element management system groups, each element management system group comprising at least one element management system server and being configured to connect to at least one network element of the plurality of network elements; and a processor that receives a system command, comprising a transaction language command, from the operation support system directed to a network element of the plurality of network elements from the at least one operation support system through the first interface, determines an element management system group from the plurality of element management system groups associated with the network element, identifies at least one active element management system server in the determined element management system group, determines a type of the active element management system server, determines at least one configuration parameter corresponding to the type of element management system server, and determines whether the active element management system server has at least one available connection having sufficient capacity to support the system command based on the at least one configuration parameter;

wherein, when the active element management system server has the at least one available connection having sufficient capacity, the processor establishes a session with the active element management system server over the at least one available connection through the second interface and sends the system command to the network element through the active element management system server, the sending comprising multiplexing the system command with at least one other command;

wherein, when the active element management system server does not have an available connection and a time out has not occurred, the common integrated access computer system determines if an alternative active element management system server is available;

when a time out has not occurred and the alternative active element management system server does not have an available connection, the common integrated access computer system buffers the request for communication with the network element and again determines whether an active element management system server has the available connection after a predetermined time; and when a time out occurs, the common integrated access computer system notifies the operation support system that a connection is not available.

12. The apparatus according to claim 11, wherein the determining the element management system group associated with the network element comprises querying a database of network elements and associated element management system groups.

* * * * *